United States Patent
Marek et al.

(10) Patent No.: US 9,660,966 B1
(45) Date of Patent: May 23, 2017

(54) MULTILEVEL SECURE COMMUNICATION SYSTEMS WITH ENCRYPTION BASED SEPARATION

(71) Applicants: James A. Marek, Anamosa, IA (US); Greg L. Shelton, Cedar Rapids, IA (US)

(72) Inventors: James A. Marek, Anamosa, IA (US); Greg L. Shelton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 63 days.

(21) Appl. No.: 14/850,665

(22) Filed: Sep. 10, 2015

(51) Int. Cl.
  *H04L 29/06* (2006.01)

(52) U.S. Cl.
  CPC .......... *H04L 63/0428* (2013.01); *H04L 63/20* (2013.01)

(58) Field of Classification Search
  CPC .............................. H04L 63/0428; H04L 63/20
  See application file for complete search history.

(56) References Cited

U.S. PATENT DOCUMENTS

| | | | | |
|---|---|---|---|---|
| 4,864,615 A * | 9/1989 | Bennett | H04N 7/1675 | 348/E7.056 |
| 6,088,800 A * | 7/2000 | Jones | G06F 7/5052 | 380/28 |
| 6,954,753 B1 * | 10/2005 | Jeran | G06F 17/30091 | |
| 7,962,702 B1 * | 6/2011 | Bean | G06F 21/79 | 711/154 |
| 8,161,281 B1 * | 4/2012 | Johnson | H04L 63/12 | 713/153 |
| 8,272,042 B2 * | 9/2012 | Mcconnell | H04L 12/2602 | 709/227 |
| 2004/0044902 A1 * | 3/2004 | Luthi | G06F 21/6218 | 726/15 |
| 2005/0268336 A1 * | 12/2005 | Finnegan | G06F 21/31 | 726/15 |
| 2007/0214359 A1 * | 9/2007 | Williamson | H04L 63/0272 | 713/163 |
| 2009/0175444 A1 * | 7/2009 | Douglis | H04L 9/083 | 380/45 |
| 2010/0031019 A1 * | 2/2010 | Manning | H04L 63/105 | 713/153 |
| 2010/0293592 A1 * | 11/2010 | Maximilien | H04L 63/0209 | 726/1 |
| 2010/0306534 A1 * | 12/2010 | Teijido | G06F 21/6218 | 713/166 |
| 2010/0333193 A1 * | 12/2010 | Goding | G06F 21/74 | 726/16 |

* cited by examiner

*Primary Examiner* — Joseph P Hirl
*Assistant Examiner* — J. Brant Murphy
(74) *Attorney, Agent, or Firm* — Angel N. Gerdzhikov; Donna P. Suchy; Daniel M. Barbieri

(57) ABSTRACT

Multilevel secure communication systems and methods for providing multilevel security to such communication systems are disclosed. More specifically, communication systems and methods configured in accordance with the inventive concepts disclosed herein may be utilized to provide support for N levels of secure communications using processors (may also be referred to as nodes) that may only have (N−M) levels of security separation (where N and M are integers and M is strictly less than N). In other words, processors that have less than N levels of security separation may be configured to form a communication system that is capable of supporting N levels of secure communication.

17 Claims, 4 Drawing Sheets

|     | TS1 | TS2 | TS3 | S1 | S2 | S3 | S4 | S5 | U1 | U2 | U3 | ... |
|-----|-----|-----|-----|----|----|----|----|----|----|----|----|-----|
| TS1 | -   | C   | C   | N  | N  | N  | N  | N  | N  | N  | N  | ... |
| TS2 | -   | -   | C   | N  | N  | N  | N  | N  | N  | N  | N  | ... |
| TS3 | -   | -   | -   | N  | N  | N  | N  | N  | N  | N  | N  | ... |
| S1  | -   | -   | -   | -  | C  | C  | C  | C  | N  | N  | N  | ... |
| S2  | -   | -   | -   | -  | -  | C  | C  | C  | N  | N  | N  | ... |
| S3  | -   | -   | -   | -  | -  | -  | C  | C  | N  | N  | N  | ... |
| S4  | -   | -   | -   | -  | -  | -  | -  | C  | N  | N  | N  | ... |
| S5  | -   | -   | -   | -  | -  | -  | -  | -  | N  | N  | N  | ... |
| U1  | -   | -   | -   | -  | -  | -  | -  | -  | -  | C  | C  | ... |
| U2  | -   | -   | -   | -  | -  | -  | -  | -  | -  | -  | C  | ... |
| U3  | -   | -   | -   | -  | -  | -  | -  | -  | -  | -  | -  | ... |
| ... | ... | ... | ... | ...| ...| ...| ...| ...| ...| ...| ...| ... |

FIG. 2

|     | TS1 | TS2 | TS3 | S1 | S2 | S3 | S4 | S5 | U1 | U2 | U3 | ... |
|-----|-----|-----|-----|----|----|----|----|----|----|----|----|-----|
| TS1 | -   | C   | C   | N  | N  | N  | N  | N  | N  | N  | N  | ... |
| TS2 | -   | -   | N   | N  | N  | N  | N  | N  | N  | N  | N  | ... |
| TS3 | -   | -   | -   | N  | N  | N  | N  | N  | N  | N  | N  | ... |
| S1  | -   | -   | -   | -  | C  | C  | C  | C  | N  | N  | N  | ... |
| S2  | -   | -   | -   | -  | -  | N  | C  | C  | N  | N  | N  | ... |
| S3  | -   | -   | -   | -  | -  | -  | N  | C  | N  | N  | N  | ... |
| S4  | -   | -   | -   | -  | -  | -  | -  | N  | N  | N  | N  | ... |
| S5  | -   | -   | -   | -  | -  | -  | -  | -  | N  | N  | N  | ... |
| U1  | -   | -   | -   | -  | -  | -  | -  | -  | -  | C  | N  | ... |
| U2  | -   | -   | -   | -  | -  | -  | -  | -  | -  | -  | C  | ... |
| U3  | -   | -   | -   | -  | -  | -  | -  | -  | -  | -  | -  | ... |
| ... | ... | ... | ... | ...| ...| ...| ...| ...| ...| ...| ...| ... |

FIG. 3

|  | TS1 | TS2 | TS3 | S1 | S2 | S3 | S4 | S5 | U1 | U2 | U3 | ... |
|---|---|---|---|---|---|---|---|---|---|---|---|---|
| TS1 | - | K1 | K1 | N | N | N | N | N | N | N | N | ... |
| TS2 | - | - | K1 | N | N | N | N | N | N | N | N | ... |
| TS3 | - | - | - | N | N | N | N | N | N | N | N | ... |
| S1 | - | - | - | - | K2 | K2 | K2 | K2 | N | N | N | ... |
| S2 | - | - | - | - | - | K2 | K2 | K2 | N | N | N | ... |
| S3 | - | - | - | - | - | - | K2 | K2 | N | N | N | ... |
| S4 | - | - | - | - | - | - | - | K2 | N | N | N | ... |
| S5 | - | - | - | - | - | - | - | - | N | N | N | ... |
| U1 | - | - | - | - | - | - | - | - | - | K3 | K3 | ... |
| U2 | - | - | - | - | - | - | - | - | - | - | K3 | ... |
| U3 | - | - | - | - | - | - | - | - | - | - | - | ... |
| ... | ... | ... | ... | ... | ... | ... | ... | ... | ... | ... | ... | ... |

FIG. 4

|  | TS1 | TS2 | TS3 | S1 | S2 | S3 | S4 | S5 | U1 | U2 | U3 | ... |
|---|---|---|---|---|---|---|---|---|---|---|---|---|
| TS1 | - | K1A | K1B | N | N | N | N | N | N | N | N | ... |
| TS2 | - | - | K1C | N | N | N | N | N | N | N | N | ... |
| TS3 | - | - | - | N | N | N | N | N | N | N | N | ... |
| S1 | - | - | - | - | K2 | K2 | K2 | K2 | N | N | N | ... |
| S2 | - | - | - | - | - | K2 | K2 | K2 | N | N | N | ... |
| S3 | - | - | - | - | - | - | K2 | K2 | N | N | N | ... |
| S4 | - | - | - | - | - | - | - | K2 | N | N | N | ... |
| S5 | - | - | - | - | - | - | - | - | N | N | N | ... |
| U1 | - | - | - | - | - | - | - | - | - | K3 | K3 | ... |
| U2 | - | - | - | - | - | - | - | - | - | - | K3 | ... |
| U3 | - | - | - | - | - | - | - | - | - | - | - | ... |
| ... | ... | ... | ... | ... | ... | ... | ... | ... | ... | ... | ... | ... |

FIG. 5

MULTILEVEL SECURE COMMUNICATION SYSTEMS WITH ENCRYPTION BASED SEPARATION

BACKGROUND

Multilevel security refers to the ability of a communication system to handle information with different classifications (e.g., different security levels), permit access by users/applications with different security clearances, and prevent users/applications from obtaining access to information for which they lack authorization. In efforts to support confidential communication and storage of information, many commercial off-the-shelf processor implementations have started to provide high-speed, on-chip cryptographic engines that have been certified to meet certain standards. It is noted, however, that these commercial off-the-shelf processor implementations are, under most circumstances, only able to provide two levels of security separation for processing.

SUMMARY

In one aspect, embodiments of the inventive concepts disclosed herein are directed to a system. The system may include a shared network and a plurality of processors communicatively connected to the shared network. The plurality of processors may define a plurality of processing units, and each processing unit of the plurality of processing units may be classified into one of a number of security classifications supported by the system. Each particular processing unit of the plurality of processing units may also be assigned an encryption key and an encryption algorithm, wherein at least one of a first encryption key and a first encryption algorithm assigned to a first processing unit classified into a first security classification is different from a second encryption key and a second encryption algorithm assigned to a second particular processing unit classified into a second security classification, and wherein each particular processing unit of the plurality of processing units is required to encrypt outgoing data to the shared network and decrypt incoming data from the shared network using the encryption key and the encryption algorithm assigned to that particular processing unit.

In a further aspect, embodiments of the inventive concepts disclosed herein are directed to a system. The system may include a shared network and a plurality of processors communicatively connected to the shared network. The plurality of processors may define a plurality of processing units, and each processing unit of the plurality of processing units may be classified into one of a number of security classifications supported by the system. Each particular processing unit of the plurality of processing units may also be assigned an encryption key, wherein a collection of encryption keys assigned to processing units classified into a first security classification is mutually exclusive with respect to a collection of encryption keys assigned to processing units classified into a second security classification, and wherein each particular processing unit of the plurality of processing units is required to encrypt outgoing data to the shared network and decrypt incoming data from the shared network using the encryption key assigned to that particular processing unit.

In another aspect, embodiments of the inventive concepts disclosed herein are directed to a method. The method may include: connecting a plurality of processors utilizing a shared network, wherein the plurality of processors defines a plurality of processing units, and wherein each processing unit of the plurality of processing units is classified into one of a number of security classifications supported over the shared network; assigning an encryption key and an encryption algorithm to each particular processing unit of the plurality of processing units, wherein at least one of a first encryption key and a first encryption algorithm assigned to a first processing unit classified into a first security classification is different from a second encryption key and a second encryption algorithm assigned to a second particular processing unit classified into a second security classification, and configuring each particular processing unit of the plurality of processing units to encrypt outgoing data to the shared network and decrypt incoming data from the shared network using the encryption key and the encryption algorithm assigned to that particular processing unit to facilitate multilevel secure communications between the plurality of processing units.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which:

FIG. 2 is an illustration depicting a connectivity map that may be utilized to indicate communications that are permitted in a communication system;

FIG. 3 is an illustration depicting another connectivity map that may be utilized to indicate communications that are permitted in a communication system;

FIG. 4 is an illustration depicting assignment of encryption keys to a plurality of processing units participating in a communication system;

FIG. 5 is an illustration depicting another assignment of encryption keys to a plurality of processing units participating in a communication system.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to multilevel secure communication systems and methods for providing multilevel security to such communication systems. More specifically, communication systems and methods configured in accordance with the inventive concepts disclosed herein may be utilized to provide support for N levels of secure communications using processors (may also be referred to as nodes)

that may only have (N−M) levels of security separation (where N and M are integers and M is strictly less than N). In other words, processors that have less than N levels of security separation may be configured to form a communication system that is capable of supporting N levels of secure communication, effectively reducing the cost (in terms of hardware and/or certification cost) of the communication system without compromising its security.

For illustrative purposes, processors with support for up to two levels of security separation (referred to as two-level secure processors) are presented in the following examples to form an exemplary secure communication system that utilizes a single shared network to support more than two levels of secure communications. The exemplary secure communication system may support three security classification levels, namely, "Unclassified", "Secret", and "Top Secret." It is noted that these security classification levels may be ranked (in either increasing or decreasing order), and for illustrative purposes, two security classification levels that are adjacent to each other in the ranking may be considered to be "adjacent" and two security classification levels that are not adjacent to each other in the ranking may be considered as "nonadjacent." It is to be understood that while the following descriptions may refer to the security classification levels as "Unclassified", "Secret", and "Top Secret," these security classification levels are merely exemplary and are not meant to be limiting. It is contemplate that secure processors with support for more than two levels of security separation may be utilized to form secure communication systems that support more than three security levels without departing from the broad scope of the inventive concepts disclosed herein.

Figure 1:
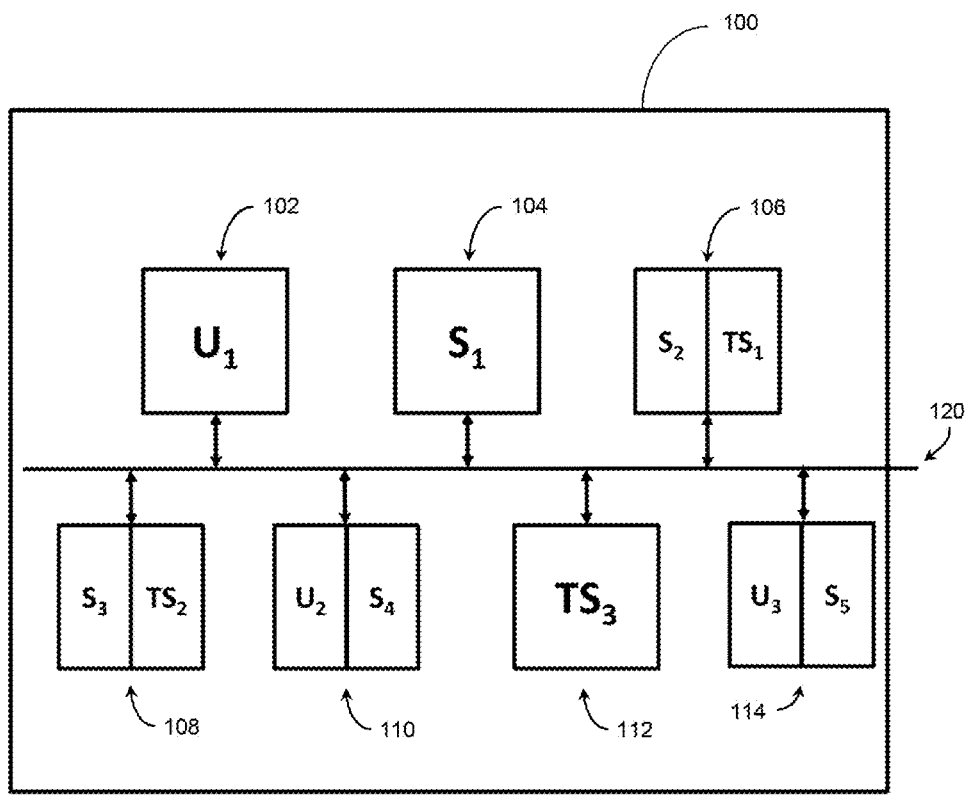
FIG. 1 is a block diagram depicting a communication system according to an exemplary embodiment of the inventive concepts disclosed herein.

Referring now to FIG. 1, a simplified block diagram depicting an exemplary communication system 100 configured in accordance with the inventive concepts disclosed herein is shown. The communication system 100 may include a plurality of participating processors 102-114 connected via a shared network 120. As shown in FIG. 1, some processors may have support for two adjacent security classifications (e.g., processors 110 and 114 may each have support for "Unclassified" and "Secret" classifications and processors 106 and 108 may each have support for "Secret" and "Top Secret" classifications), but some processors may only have the abilities to support one security classification (e.g., processor 102 may only support "Unclassified" classification, processor 104 may only support "Secret" classification, and processor 112 may only support "Top Secret" classification).

From an operation's perspective, the cryptographic engines provided by the two-level processors 106, 108, 110, and 114 may allow each separated portion of the two-level processors 106, 108, 110, and 114 to behave like a unit on the network 120 in the same manner as the single-level processors 102, 104, and 112. To help distinguish these units for illustrative purposes, they are labeled with different reference characters in FIG. 1. For example, "S1" corresponds to the single-level processor 104 that has a "Secret" classification. "S3", on the other hand, corresponds to only a particular portion of the two-level processor 108, where that particular portion has a "Secret" classification.

For the communication system 100 to be considered multilevel secure, it is required for the communication system 100 to implement techniques that prevent a unit assigned to one security classification from communicating with another unit assigned to a different security classification. To satisfy this requirement, the communication system 100 configured in accordance with the inventive concepts disclosed herein may implement a technique referred to as encryption based separation. Implementing encryption based separation effectively allows "Unclassified", "Secret", and "Top Secret" communications to coexist on the shared network 120 and simultaneously enforces logical separations among them so that "Unclassified", "Secret", and "Top Secret" communications cannot be commingled.

More specifically, the communication system 100 may utilize different sets of encryption keys and/or encryption algorithms to provide logically separate end-to-end cryptographic tunnels between the various units participating on the network 120. Using FIG. 1 as an example, by grouping encryption keys into (at least) three different key sets and associating a particular key set to units classified into a particular security classification, communications between units operating within the same security classification can be established but communications between units across different security classifications (if attempted) will be forced to fail (due to mismatched encryption keys), effectively forming (at least) three coexisting but logically separate secure enclaves.

In certain implementations, the communication system 100 may utilize a connectivity map to help facilitate the establishment of the secure enclaves. For instance, FIG. 2 shows an exemplary connectivity map 200 that may be utilized to indicate communications that are permitted in the communication system 100. More specifically, the connectivity map 200 shown in FIG. 2 depicts fully interconnected enclaves, meaning that all "Top Secret" level units TS1, TS2, and TS3 may communicate with each other, all "Secret" level units S1, S2, S3, S4, and S5 may communicate with each other, and all "Unclassified" level units U1, U2, and U3 may communicate with each other.

It is noted, however, that the enclaves are not required to be fully interconnected. FIG. 3 shows an exemplary connectivity map 300 that defines partially interconnected enclaves. Different from the fully interconnected enclaves defined by the connectivity map 200, the connectivity map 300 may prohibit direct communications between TS2 and TS3, for example. The connectivity map 300 may also prohibit direct communications between S2 and S3, between S3 and S4, and between S4 and S5. Similarly, the connectivity map 300 may further prohibit direct communications between U1 and U3.

It is to be understood that the connectivity maps 200/300 described above are merely exemplary and are not meant to be limiting. It is contemplated that the connectivity maps may be defined to reflect connectivity requirement of the communication systems 100, which may vary from the illustrations presented above. It is also to be understood that the term "map" used in the descriptions above is not limited to any particular data format. It is contemplated that such maps may be stored as tables, graphs, text records, binary records, database records or the like without departing from the broad scope of the inventive concepts disclosed herein. It is also contemplated that various types of data storage mediums may be utilized to store the connectivity maps, as long as they are made accessible to the processors 102-114 either locally or via shared (wired or wireless) data access mechanisms.

Furthermore, it is to be understood that a connectivity map is not required to store the entire connectivity data of a communication system. For instance, a connectively map storing only connectively data of processing units classified as "Top Secret" may be created and made accessible specifically for such processing units. Similarly, connectivity maps that are specific to the "Secret" and/or the "Unclassified" processing units may also be managed in this manner. It is to be understood, therefore, that the connectivity maps 200 and 300 are shown to include connectivity data of the entire communication system 100 merely for illustrative purposes and are not meant to be limiting.

It is noted that while specific implementations of the connectivity map(s) may vary, they all serve to provide information regarding connections that can be established with the communication system 100. The communication system 100 may therefore utilize the information provided by the connectivity map(s) to assign different encryption keys to processing units with different classifications, ensuring the processing units with different classifications can be logically separated using the different encryption keys.

More specifically, FIG. 4 shows an exemplary configuration 400 where three different encryption keys (K1, K2, and K3) are assigned to the processing units on the network 120 according to the connectivity map defined in FIG. 2. It is noted that because processing units classified into the same classification are assigned the same key for data encryption/decryption, communications between them are supported. However, since processing units classified into different classifications are assigned different keys, they cannot communicate with each other because they cannot properly encrypt (or decrypt) data to be sent to (or received from) one another.

It is contemplated that various techniques may be utilized to help assign different keys to different processing units. For instance, keys may be pre-placed at the various processing units ahead of time before they start to communicate with each other. Alternatively and/or additionally, other key distribution, generation, and/or negotiation techniques may be utilized to help assign different keys to different units. For instance, the communication system 100 may restrict network access for units classified into a particular security classification(s) while units classified into a different security classification(s) distribute, generate and/or negotiate their keys over the network 120. It is contemplated that network access can be restricted using techniques such as network switch control, powers cycle and the like. It is also contemplated that other key distribution, generation, and/or negotiation techniques may also be utilized without departing from the broad scope of the inventive concepts disclosed herein.

Certain implementations may utilize techniques to prohibit units classified into nonadjacent security classifications from distributing, generating and/or negotiating their keys over the network 120 at the same time. For instance, referring to the example shown in FIG. 1, in order to eliminate the possibility of a "Top Secret" to "Unclassified" compromise, all processors with a "Top Secret" processing unit may be disabled or disconnected from the network 120 while the remaining processors distribute their "Unclassified" and/or "Secret" keys. Similarly, all processors with an "Unclassified" processing unit may be disabled or disconnected from the network 120 while the remaining processors distribute their "Top Secret" and/or "Secret" keys. Once the units are assigned with keys, they are required to always encrypt/decrypt network traffic using their assigned keys, which help to ensure that it will take at least two failures for an unauthorized communication (e.g., a "Top Secret" to "Unclassified" compromise or the like) to occur.

It is to be understood that the assignment of three different keys to three different security classifications as shown in FIG. 4 is merely exemplary. It is contemplated that more than three keys may be utilized without departing from the broad scope of the inventive concepts disclosed herein. For instance, FIG. 5 shows another exemplary configuration 500 where six different encryption keys (K1A, K1B, K1C, K2A, K2B, and K3) are assigned to the units on the network 120 according to the connectivity map defined in FIG. 2. It is noted that while some of the keys are unique, the collection of the keys as a whole may still be considered as forming three mutually exclusive sets (i.e., one set for each classification), where the first set contains the keys used by the "Top Secret" enclave (e.g., K1A, K1B, and K1C), the second set contains the keys used by the "Secret" enclave (e.g., K2A and K2B), and the third set contains the key(s) used by the "Unclassified" enclave (e.g., K3). It is contemplated that as long as these three key sets remain mutually exclusive, the encryption based separation techniques disclosed herein will be able to keep the three enclaves logically separated without compromising their security.

It is also contemplated that the encryption based separation techniques disclosed herein may support a variety of encryption algorithms for separation and approaches without departing from the broad scope of the inventive concepts disclosed herein. For instance, in certain implementations, all units within the communication system may utilize the same encryption algorithm (but with different keys as previously described). Alternatively, in certain implementations, it is permissible for some of the units to use different encryption algorithm(s) in addition to using different keys to encrypt/decrypt network data without departing from the broad scope of the inventive concepts disclosed herein.

It is further contemplated that the encryption based separation techniques disclosed herein is not network specific (i.e., agnostic to the underlying network technology), allowing the encryption based separation techniques to support a verity of communication methods that may be used by the communication system 100, whether it is unicast, multicast, or broadcast. It is noted that the term "network" may refer to any known and/or yet-to-be developed data exchanging mechanisms. It is also noted that the encryption based separation techniques disclosed herein may allow untrusted network components (e.g., network routers or the like) to be utilized without compromising the security of the communication system 100. It is contemplated that the ability to allow untrusted network components to be utilized may be appreciated for various reasons, including lowered design and maintenance cost, increased component flexibility, reduced system complexity and the like.

It is to be understood that the references to "Unclassified", "Secret", and "Top Secret" security classifications are merely exemplary and are not meant to be limiting. It is contemplated that the encryption based separation techniques disclosed herein are applicable to communications systems with classifications under different names/labels without departing from the broad scope of the inventive concepts disclosed herein. Additionally, it is contemplated that the encryption based separation techniques disclosed herein are applicable to communication systems with more than one shared networks without departing from the broad scope of the inventive concepts disclosed herein.

Figure 6:
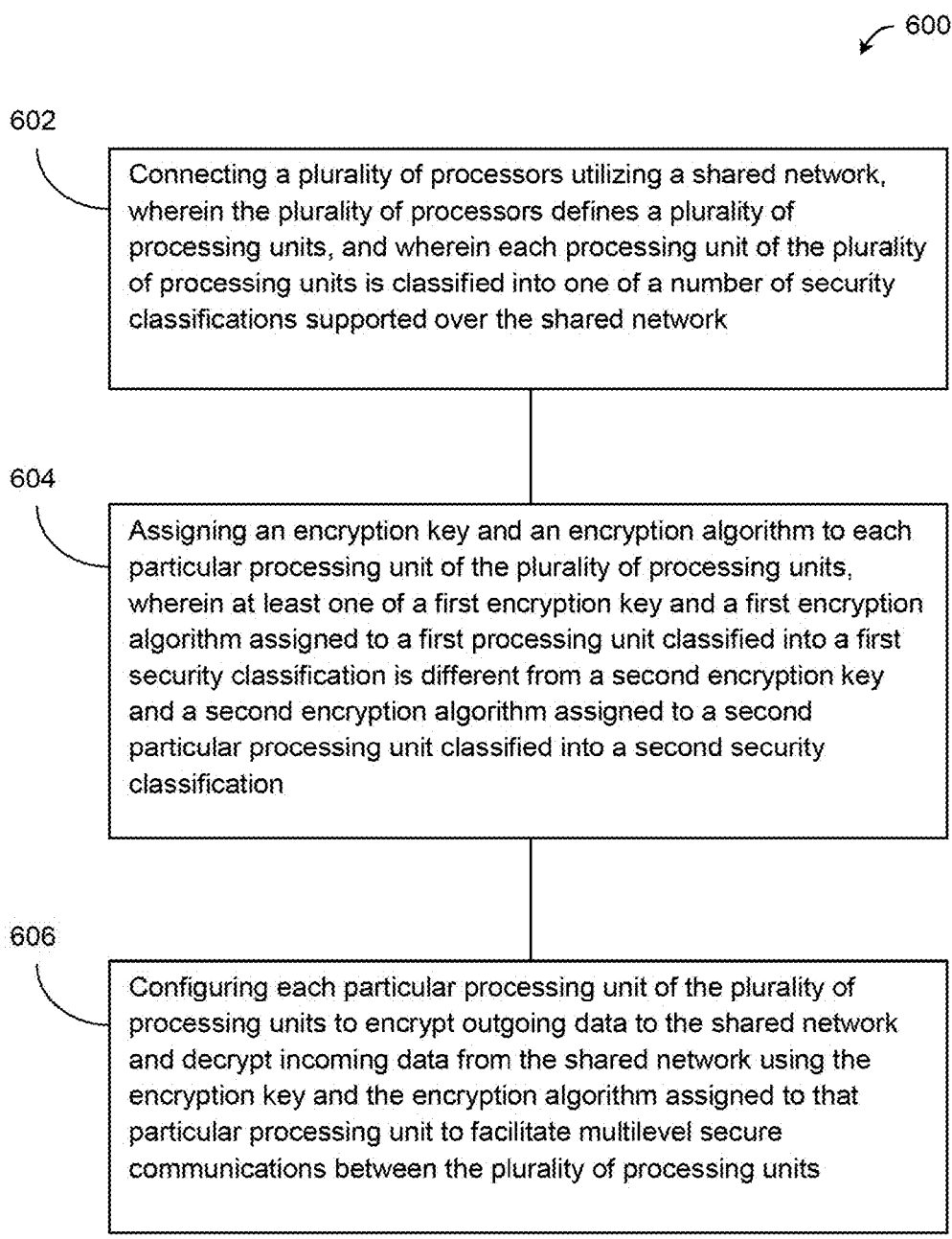
FIG. 6 is a flow diagram depicting a method for providing multilevel security to a communication system according to an exemplary embodiment of the inventive concepts disclosed herein.

Referring now to FIG. 6, a flow diagram depicting a method 600 that may be utilized to provide multilevel security to a communication system is shown. More specifically, the method 600 may be utilized to provide support for N levels of secure communications using processors that have less than N levels of security separation. As shown in FIG. 6, a plurality of processors may be connected to a shared network in a step 602. It is contemplated that the processors may include dedicated processing units, application-specific integrated circuits (ASICs), field-programmable gate arrays (FPGAs), or various other types of processing boxes, boards, cards, chips, cores and the like. It is noted that each processor may define one or more processing units. In the case of a single level processor, the processor may be considered as a single processing unit. In the case of a two- (or multi-) level processor, the processor may define two (or more) processing units, wherein each processing unit is defined as a proper subset of that processor and is always configured to operate only within a single classification level. It is contemplated that the processing units may be implemented utilizing virtual machines and/or physical machines without departing from the broad scope of the inventive concepts disclosed herein.

Encryption mechanisms (including encryption keys and/or encryption algorithms) may be assigned to the processing units in a step 604 to implement the encryption based separation technique as described above. It is contemplated that the encryption keys may be pre-placed, distributed, generated, and/or negotiated in various manners without departing from the broad scope of the inventive concepts disclosed herein, as long as a collection of encryption keys assigned to processing units classified into one security classification is configured to be mutually exclusive with respect to a collection of encryption keys assigned to processing units classified into another security classification. Once the processing units are assigned with encryption keys and encryption algorithms, they may be configured in a step 606 to always encrypt outgoing data to the shared network and decrypt incoming data from the shared network using their assigned encryption keys and encryption algorithms, effectively allowing the processing units to be established as a multilevel secure communication system as described above.

It is contemplated that the systems and methods in accordance with the inventive concepts disclosed herein may be applicable to various types of operating environment not specifically mentioned above. For instance, the encryption based separation techniques disclosed herein may be applicable to a multiple levels of security (MLS) processing unit that does not have network connections itself, but is connected to one or more single level processing units that are connected to a network. The encryption based separation techniques disclosed herein may be utilized, in this exemplary case, as a cross domain guard for the MLS processing unit. It is to be understood that the encryption based separation techniques disclosed herein may be utilized in various other manners without departing from the broad scope of the inventive concepts disclosed herein.

It is to be understood that embodiments of the inventive concepts disclosed herein may be conveniently implemented in forms of a software, hardware or firmware package (or a combination thereof). Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that the specific order or hierarchy of steps in the processes disclosed is an example of exemplary approaches. It is to be understood that the specific order or hierarchy of steps in the processes may be rearranged while remaining within the broad scope of the inventive concepts disclosed herein. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising:
    connecting a plurality of processors utilizing a shared network, wherein the plurality of processors defines a plurality of processing units, and wherein each processing unit of the plurality of processing units is classified into one of a number of security classifications supported over the shared network;
    assigning an encryption key and an encryption algorithm to each particular processing unit of the plurality of processing units, wherein at least one of a first encryption key and a first encryption algorithm assigned to a first processing unit classified into a first security classification is different from a second encryption key and a second encryption algorithm assigned to a second particular processing unit classified into a second security classification, wherein the encryption keys are generated, negotiated, or distributed to the plurality of processing units based on connectivity data specified for the plurality of processing units, and wherein processing units classified into nonadjacent security classifications are prohibited from generating, negotiating, or distributing encryption keys over the shared network simultaneously, and
    configuring each particular processing unit of the plurality of processing units to encrypt outgoing data to the shared network and decrypt incoming data from the shared network using the encryption key and the encryption algorithm assigned to that particular processing unit to facilitate multilevel secure communications between the plurality of processing units.

2. The method of claim 1, wherein at least one processor of the plurality of processors is a multilevel secure processor with support for at least two processing units classified into different security classifications.

3. The method of claim 2, wherein said different security classifications supported by the at least one multilevel secure processor are adjacent security classifications.

4. The method of claim 2, wherein a maximum number of different security classifications supported by the at least one multilevel secure processor is less than the number of security classifications supported over the shared network.

5. The method of claim 1, wherein the connectivity data specified for the system is utilized to facilitate establishment of secure enclaves.

6. The method of claim 5, wherein at least one secure enclave established by the connectivity data is a partially interconnected secure enclave.

7. A system, comprising:
    a shared network;
    a plurality of processors communicatively connected to the shared network, the plurality of processors defining a plurality of processing units, each processing unit of the plurality of processing units being classified into one of a number of security classifications supported by the system, wherein each particular processing unit of the plurality of processing units is assigned an encryption key and an encryption algorithm, wherein at least one of a first encryption key and a first encryption algorithm assigned to a first processing unit classified into a first security classification is different from a second encryption key and a second encryption algorithm assigned to a second particular processing unit classified into a second security classification, and wherein each particular processing unit of the plurality of processing units is required to encrypt outgoing data to the shared network and decrypt incoming data from the shared network using the encryption key and the encryption algorithm assigned to that particular processing unit, wherein the encryption keys are generated, negotiated, or distributed to the processing units based on connectivity data specified for the system, and wherein the processing units classified into nonadjacent security classifications are prohibited from generating, negotiating, or distributing encryption keys over the shared network simultaneously.

8. The system of claim 7, wherein at least one processor of the plurality of processors is a multilevel secure processor with support for at least two processing units classified into different security classifications.

9. The system of claim 8, wherein said different security classifications supported by the at least one multilevel secure processor are adjacent security classifications.

10. The system of claim 8, wherein a maximum number of different security classifications supported by the at least one multilevel secure processor is less than the number of security classifications supported by the system.

11. The system of claim 7, wherein the connectivity data specified for the system is utilized to facilitate establishment of secure enclaves.

12. The system of claim 11, wherein at least one secure enclave established by the connectivity data is a partially interconnected secure enclave.

13. A system, comprising:

a shared network;

a plurality of processors communicatively connected to the shared network, the plurality of processors defining a plurality of processing units, each processing unit of the plurality of processing units being classified into one of a number of security classifications supported by the system;

wherein each particular processing unit of the plurality of processing units is assigned an encryption key, wherein a collection of encryption keys assigned to processing units classified into a first security classification is mutually exclusive with respect to a collection of encryption keys assigned to processing units classified into a second security classification, and wherein each particular processing unit of the plurality of processing units is required to encrypt outgoing data to the shared network and decrypt incoming data from the shared network using the encryption key assigned to that particular processing unit, wherein the encryption keys are generated, negotiated, or distributed to the processing units based on connectivity data specified for the system, and wherein the processing units classified into nonadjacent security classifications are prohibited from generating, negotiating, or distributing encryption keys over the shared network simultaneously.

14. The system of claim 13, wherein at least one processor of the plurality of processors is a multilevel secure processor with support for at least two processing units classified into different security classifications, and wherein said different security classifications are adjacent security classifications.

15. The system of claim 14, wherein a maximum number of different security classifications supported by the at least one multilevel secure processor is less than the number of security classifications supported by the system.

16. The system of claim 13, wherein the connectivity data specified for the system is utilized to facilitate establishment of secure enclaves.

17. The system of claim 16, wherein at least one secure enclave established by the connectivity data is a partially interconnected secure enclave.

* * * * *